April 9, 1963 G. FIGNA 3,084,383
MANUFACTURE OF PLASTIC ARTICLES
Filed April 12, 1961 4 Sheets-Sheet 1

INVENTOR:
GIOVANNA FIGNA
BY Michael S. Striker
her ATTORNEY

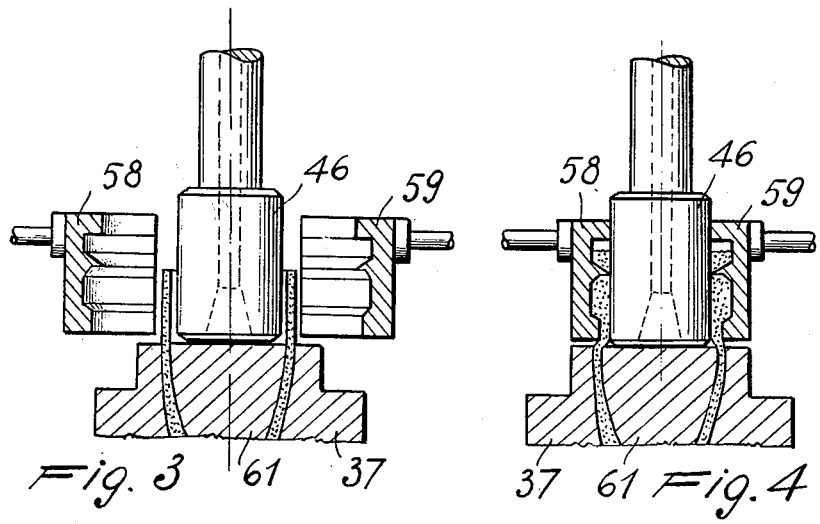
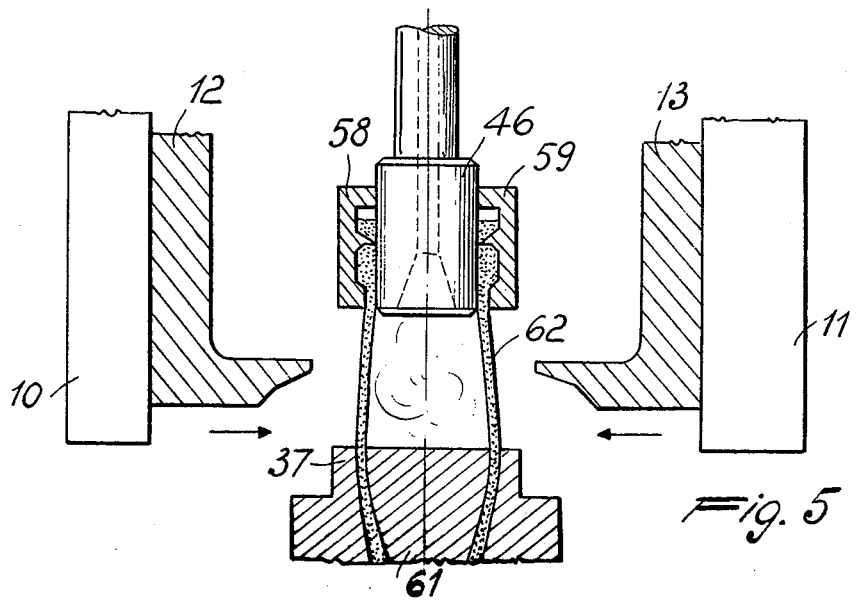
INVENTOR:
GIOVANNA FIGNA

April 9, 1963  G. FIGNA  3,084,383
MANUFACTURE OF PLASTIC ARTICLES
Filed April 12, 1961  4 Sheets-Sheet 4

INVENTOR:
GIOVANNA FIGNA

BY Michael S. Striker
her ATTORNEY

United States Patent Office 3,084,383
Patented Apr. 9, 1963

3,084,383
MANUFACTURE OF PLASTIC ARTICLES
Giovanna Figna, Milan, Italy, assignor to
A. Triulzi S.A.S., Milan, Italy
Filed Apr. 12, 1961, Ser. No. 102,417
Claims priority, application Italy Aug. 6, 1960
5 Claims. (Cl. 18—5)

This invention relates to a process and apparatus for the manufacture of insufflated hollow articles of plastic material.

Known methods for the manufacture of hollow plastic bodies in general involve the extrusion of a tube of plastic material, the enclosure of the tube within a mould made in two halves, the injection of air or other fluid into the so enclosed tube in order to make its walls stick to the inside surface of the mould, and the cooling of the moulded article so it retains the shape received by the fluid injection. In accordance with this known method of manufacture, the axis of the die is disposed vertically so that a length of the tube corresponding to the size of the mould is moved downwards in order to be enclosed within its halves.

This known method presents several drawbacks, particularly for the manufacture of hollow bodies of large sizes and heavy weight. As a matter of fact, during the operation of drawing the tube, the portions that come out from the die are always pulled down by the weight of the portions drawn immediately before, which causes an excessive stretching action so that the finished articles have walls that are not uniform in thickness. This drawback cannot be avoided by accelerating the drawing, as is tried with the most modern machinery.

Another drawback is observed in the manufacture of receptacles provided with a neck of particular thickness. This neck is made as the last portion of the insufflated hollow articles, and due to the fact that much time is required for its cooling, the output of the machinery is reduced.

The process of this invention is characterised by the fact that the tube to be insufflated is drawn vertically upwards. The tube coming out from the die is clasped by mobile clasping means that hoist it in accordance with the speed of drawing through the die.

Thus, the tube is not submitted to stretching, so that articles with uniform wall thickness will be manufactured. Further, by controlling or varying the hoisting speed of the drawn tube it is possible to manufacture articles with differentially thickened walls. Thus only one die will be sufficient for the manufacture of several types of insufflated hollow articles.

In the application of this invention to the manufacture of receptacles with a neck of particular thickness, the neck will be moulded within the mould halves from the first material to pass through the die during the raising of the tube by the clasping means, so that the neck portion will solidify during the further manufacturing of the receptacles. Thus, the manufactured article may be removed from the machine as soon as it is sufficiently solid, without any loss of time for the solidification of the neck. Of course, the process of this invention allows a much quicker manufacture and a large output.

The machine in accordance with the present invention is a kind of extruding moulding and insufflating press. This press is composed of a base part having in its middle portion a plane from which the die projects vertically, and, coaxially with the die, a mobile head, comprising a movable insufflating mouth. Moving with the insufflating mouth is a traverse that supports two mobile ring halves disposed horizontally and enabled to embrace the edge of the just-extruded tube in order to raise it together with the insufflating mouth in proportion to the speed of the extrusion from the die. According to a form of the invention, both ring halves may be internally shaped in relief in accordance with the shape of the neck of the receptacle to be obtained.

In a further embodiment of the invention, the mould-halves bearing-plates travel on prismatic guiding and supporting means, thus eliminating conventional guiding shafts, which lead to difficulty in removing the finished articles, particularly when they are made in large sizes.

A further embodiment of this invention resides in the fact that the stroke of the mobile mould halves supporting plates is controlled by means that ensure the exact closing of the mould halves without creating any undue or irregular mechanical stresses either on the insufflating head or on the means that have to operate with it.

The invention will be described in detail with reference to the attached drawings, in which:

FIGS. 3, 4, 5 and 6 are successive steps of the manufacture of an insufflated hollow article.

Figure 1:
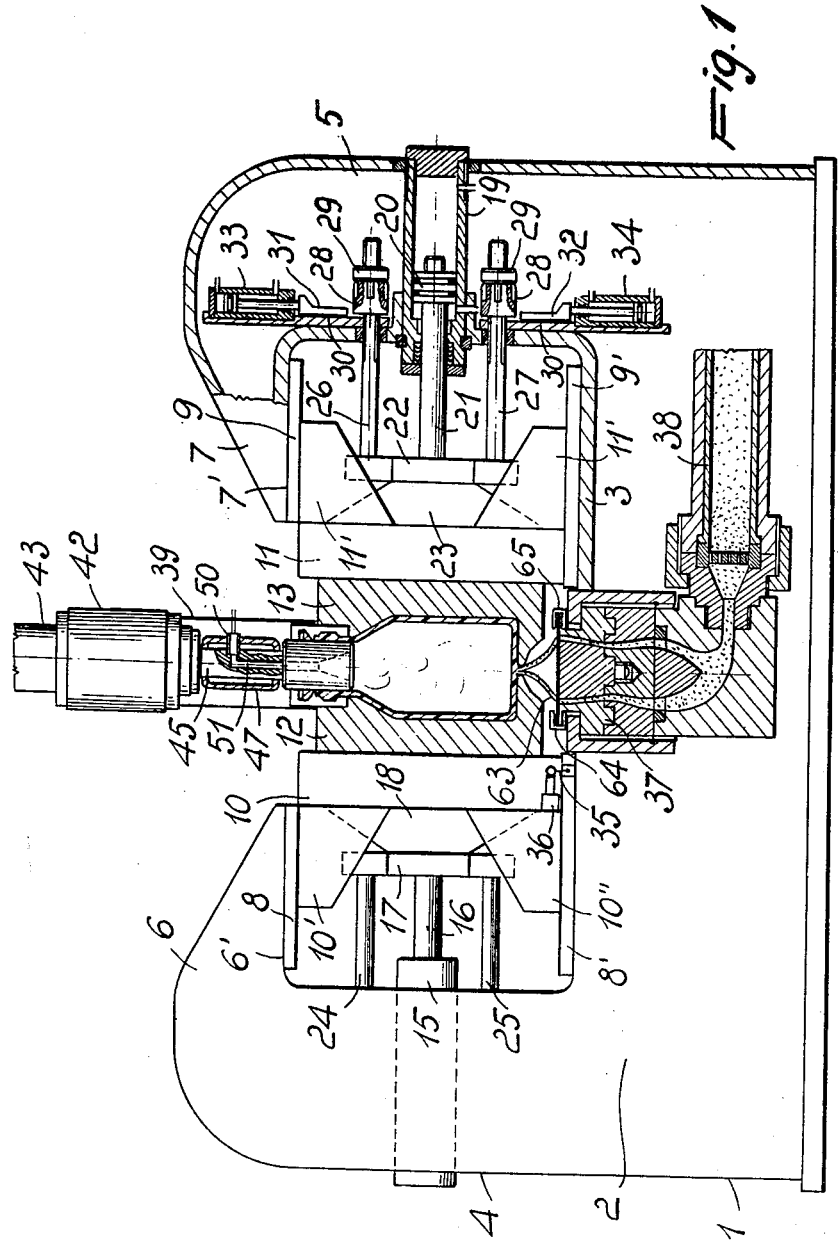
FIG. 1 is a front view of the whole machine or press, partly in longitudinal, vertical section.
Figure 2:
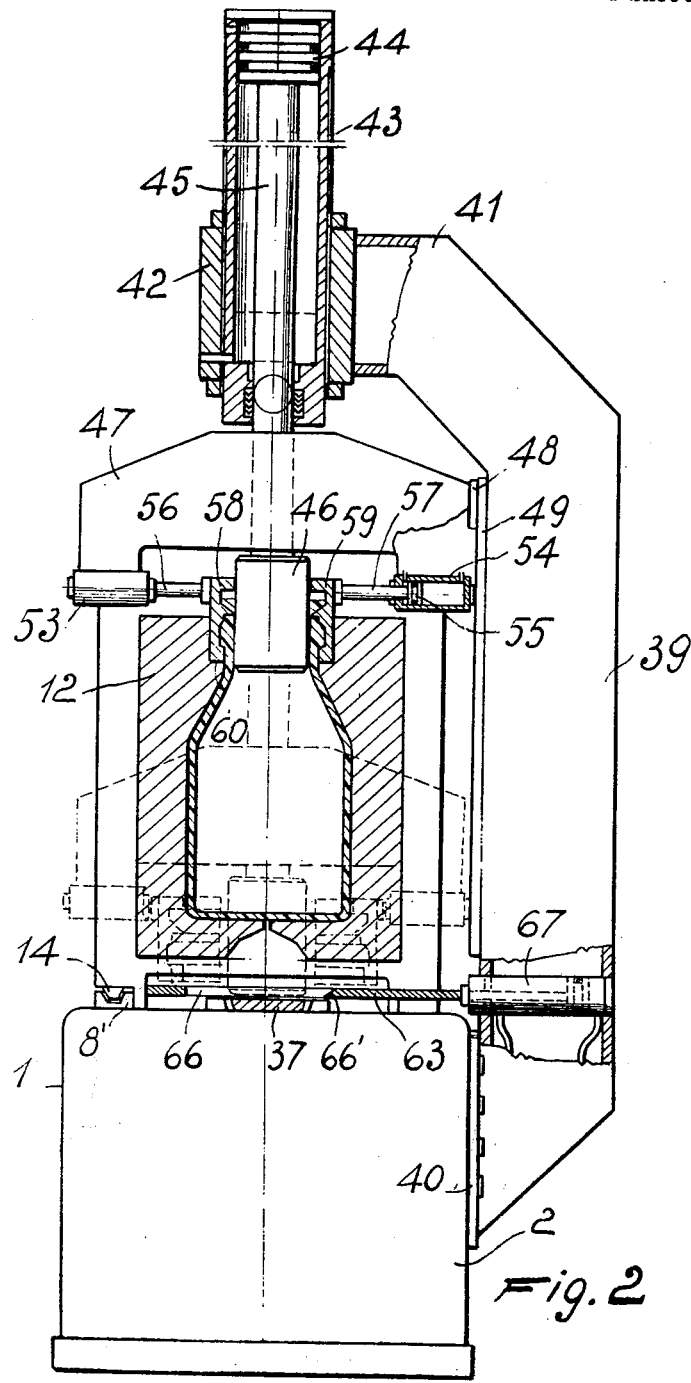
FIG. 2 is a side view of the press, partly in transversal section.

Referring to FIGS. 1 and 2, the machine or press of this invention comprises a structure 1 presenting a base plate 2 showing at its upper surface a horizontal plane 3. The structure is composed of two side uprights 4 and 5 from which two brackets 6 and 7 project inwards. These brackets have horizontal surfaces 6' and 7' facing the horizontal plane 3 of the base plate of the press. On surface 6' and on the corresponding part of plane 3 there are mounted prismatic guides 8, 8' and on the surface 7' and on the corresponding part of plane portion 3 are mounted prismatic guides 9, 9'. These are used for guiding the supporting plates 10 and 11 during their movements of opening and closing the mould halves 12 and 13, respectively. To this end, plate 10 is provided with two ribs 10' and 10" which presents slippers 14 which slide on the guide. In the same manner, plate 11 is provided with ribs 11' and 11" which slide through their own slippers on guides 9, 9'.

By this construction, conventional guide shafts for the plates are eliminated, and this elimination allows the manufactured articles to be more easily removed from the press. Moreover, smaller guiding plates or, conversely, larger mould halves, may be used for larger articles.

Plate 10 is moved by the operation of a hydraulic device comprising a cylinder 15 within which a reciprocable ram 16 is connected to a collar 17 terminating on reinforcing ribs 18 of plate 10. In the same manner plate 11 is moved by means of a hydraulic device composed of a cylinder 19 containing a reciprocable ram 20, the shaft of which is connected to the collar 22 terminating on reinforcing ribs 23 of plate 11. The operation of both devices 15 and 19 of course takes place simultaneously, thus acting upon plates 10 and 11 in order to move them simultaneously either towards the closed or the open position. Parallel to the shaft 16 are two guiding rods 24 and 25; parallel to the shaft 21 are two other guiding rods 26 and 27. All these rods have threaded ends entering the uprights 4 and 5 of the machine structure, each threaded end having a nut 28 and a checknut 29. Nuts 28 are used with the check nuts for recording the position in which they lie against wall 30, thus ensuring the true position of maximum advance of the supporting plates in the position of closure and the exact point of meeting together of the corresponding central line of the outer borders of the mould halves 12 and 13.

Figure 6:
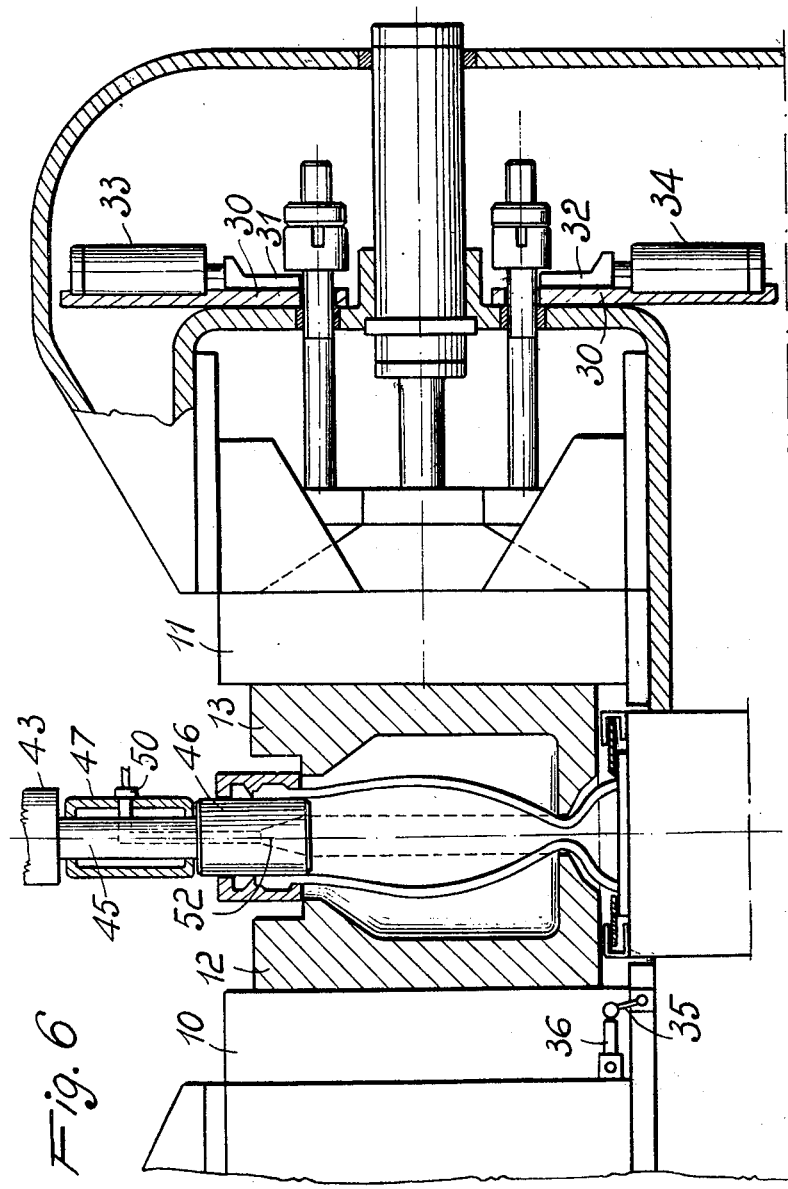

As shown in FIGS. 1 and 6, wedges 31 and 32 respectively slide along the surface 30 of the nuts 28 screwed on the rods 26 and 27, these wedges being moved by double-acting hydraulic rams 33 and 34, respectively. These wedges, when the plate 11 is moved to the right, are displaced by the respective hydraulic devices against the rods 26 and 27, in order to interpose, as shown in FIG. 6, between the surfaces 30 and the nuts 28, this impeding plate 11 during the last portion of its stroke of closing. The wedges 31 and 32 withdraw only when the plate 10 has itself made its closing stroke and has travelled forward to a position where a switch 35 is controlled by means of a projection 36 supported by said plate. This switch controls electro-valves or the like which control in turn hydraulic devices 33 and 34, thus recalling the wedges 31 and 32, and allowing further advance of plate 11. The provision of the wedges 31 and 32 impedes the total closing of plate 11 in case plate 10 should not have been displaced in use, and in the same time ensures that both mould halves exactly meet on the centre line in case the nuts 28 should have received erroneous checking or should have unscrewed by themselves.

A drawing head 37 projects from the plane 3 corresponding with the centre vertical line; this drawing head is fed by a preplastifying device 38 known per se, preferably a screw or ram preplastifier. The exit of drawing head or die is turned upwards, and is provided for drawing a tube of plastic stuff also directed upwards. An upright 39 connected to the base plate (FIG. 2) projects upwards in correspondence with the centre plane at the rear part of the base plate of the machine; the connection may be made by means of a nailed flange 40 or in any other manner more convenient. Upright 39 has an elbow 41 inclined in such a manner as to support over the machine and in coaxial position with die 37 a strong sleeve 42 which acts as support for a cylinder 43 which also is disposed coaxially with the die 37.

Within cylinder 43 slides a reciprocable ram 44 which projects downwards in order to present an insufflating nozzle 46 and to support over this nozzle a cross-piece 47, whereby the nozzle 46 and cross-piece 47 may effect simultaneously downwards stroke upwards strokes under the force exerted by ram 44.

The cross-piece 47 is provided with a slipper 48 which slides in a prismatic guiding 49 provided at the internal side of the upright 39, such that the cross-piece cannot be submitted to any angular movement around the axis of shaft 45.

As shown in FIGS. 1 and 6, a connecting piece 50, which passes through the wall of the cross-piece 47 and enters a bore of the shaft 45, connects a source of compressed air or other adapted fluid with a conduit 51 axially disposed and contained in that shaft, further reaching distributing nozzle 52 of the mouth 46, from which the air can discharge to the atmosphere.

Cross-piece 47 presents, one at each end, two hydraulic devices 53 and 54 disposed in horizontal position and each one actuating a ram 55 for double hydraulic effect. The shafts 56 and 57 of these hydraulic devices support the ring halves 58 and 59, respectively, so as to put the ring halves away from the mouth 46 or to press them against it in order to provide a pressing ring about it.

The ring halves 58 and 59 may be relief-shaped in their internal portion, as shown in all figures of the drawing, so as to obtain the required conformation of the thickened neck of the receptacle. In such a case, the lower portion of the ring halves is enclosed within the mould halves 12 and 13 during the insufflation phase, which mould halves present a stopping portion 60 which may eventually be provided with a certain conicity with a view to providing a continuation of the internal lowest border of the ring halves and to have a corresponding connection with the receptacle neck and walls.

The pressing and extruding process of the machine of this invention is described and illustrated more in detail in FIGS. 2 to 6. Before the plastic tube is drawn, the ram 44 within the cylinder 43 is induced to move downwards so as to bring the mouth piece 46 to lie near the centre portion 61 of the die 37. This mouth piece moves together with the cross-piece 47, the ring halves 58 and 59 being far from the mouth piece. At this instant, the plastic material begins to come out from the die and surrounds said mouth piece 46 (FIG. 3). As soon as a sufficient quantity of plastic has come out of the ring halves 58 and 59 are induced to close or embrace the beginning of the drawn tube, as better shown in FIG. 4, so as to provide for shaping it against the mouth piece 46. At this instant ram 44, which slides within the cylinder 43, is induced to rise, thus hoisting at the same time both the mouth piece 46 and the ring halves 58 and 59 which are bound close to it. The hoisting speed of the mouth piece 46 and ring halves 58 and 59 is of course controlled upon the drawing or extruding speed of the plastics from the die in correspondence with the tube 62 (FIG. 5). As the tube comes out from the die 37 the plates 10 and 11 may begin their moving of closure of the mould halves. Consequently, when the mouth piece 46 and the ring halves 58 and 59 will have reached the upper end of their stroke, both mould halves 12 and 13 will have reached the position shown in FIG. 6 in which the complete closure of the mould half 13 is impeded by the intervention of the wedges 31 and 32, till the switch 35 allows the mould half 13 to advance by causing the retraction of the wedges, and consequently allowing the complete closing of the mould pieces. At this instant the compressed air is insufflated through the conduit 51 and the mouth piece 52, so that the tube is inflated and its envelope constrained to adhere to the inner surfaces of the mould halves, as shown in FIGS. 1 and 2.

As appears from the FIGS. 3 to 6, the extruded tube 62 is sustained at its upper portion by the ring halves 58 and 59, on which no influence is exerted by the weight of sections that are successively drawn, so that a constant uniform thickness of all walls of the finished articles may be ensured. Furthermore, the speed of hoisting of the mouth piece 46 and the ring halves 58 and 59 may be controlled and regulated in respect of the speed of drawing or extruding of the tube, so that there is the possibility to adapt the hoisting speed to the drawing speed. Thus, a quicker hoisting speed will produce an article of thinner wall, an equal hoisting a natural wall thickness, and a lower hoisting a thicker wall of the finished article. Thus the process of the invention may also be applied for the manufacture of insufflated hollow articles with walls of varying thickness.

It is moreover of considerable technical importance that, in the case of manufacture of articles with particularly thickened neck, the neck is obtained by means of the correspondingly shaped ring halves 58 and 59 in the first step of extrusion. When the tube is extruded in full and insufflated with air, the portion that constitutes the neck has had sufficient time to solidify, thus allowing the immediate removal of the finished article, and accelerating in considerable proportion the speed of production and consequently the output of the machine provided by this invention.

As further shown by FIGS. 1 and 2, over the die 37, and shaving the plane of the die, a cutting device 63 is disposed. This device is constituted by a sliding plate between two lateral guides 64 and 65, provided with a large window 66 in its centre portion which, in the resting position of the cutting device, leaves said die 37 uncovered, thus allowing the end of the mouth piece 46 to pass through it. One side edge 66' of window 66 is sharpened, and acts as cutting blade. When the mould halves 12 and 13 have been closed around the tube 62, the cutting device slides so taht its sharpened edge 66' cuts the tube portion that is still engaged in the die. The movement of this cutting device may be obtained from a hydraulic complex 67 comprising a double acting hydraulic ram. The construction of the aforesaid cutting device 63 and its position in respect of the exit of the die have the purpose of cutting without injuring the tube portion that remains in the die, which will have to form the mouth portion of the next extruded tube for the succeeding insufflated hollow article, in order to ensure the appropriate positioning of the mould piece 46 for insufflation. After the cutting operation by the cutting device 63 has taken place, the latter rests on the exit of the die, thus impeding any further extruding of plastics in the molten state, which accumulates within the preplastifier. The recalling of the cutting device 63 frees the die exit ready for extruding a new tube.

The step of insufflation can occur when the mould halves 12 and 13 have been closed on one another; the same operation can be realised in several steps, e.g. it may begin just on the beginning of the upward movement of the mouth piece 46 together with the ring halves 58 and 59, in order to maintain the tube under a determined state of rigidity due to the incipient insufflation. The insufflation may be maintained also at the instant of removing the finished article in order to render more easy the corresponding operation from the mouth piece 46.

On termination of the cooling of the article within the mould halves, the latter are opened under the action of the hydraulic devices 15 and 19 onto the plates 10 and 11, whilst at the same time the ring halves 58 and 59 are opened due to the action of the hydraulic devices 53 and 54. At this instant the finished article may be removed either manually or by the action of a further insufflation of air through the mouth piece 46. The removal is in any case facilitated by the fact that on opening the mould halves no obstacle is present to the finished article, which may be expelled by air inflating and placed on to a band conveyor for transportation to the stock or any further plant of further using or finishing.

Of course, the invention can be actuated by other forms of realisation in respect of that described hereabove and illustrated in the attached drawings. For instance, the ring halves 58 and 59 may be reduced to the sole function of embracing the beginning of the extruded tube on the end portion of the mouth piece 46. Furthermore, the mouth piece may be reduced to an organ for introducing the extruded tube for its clasping, whilst the insufflation may be fulfilled by means of a coaxially disposed piping in respect of the extruding die, and thus shaped and disposed in respect of the mould halves with a view to obtaining by means of the mould halves the eventual neck of the receptacle.

What I claim is:

1. A method of forming hollow articles of plastic material comprising the steps of freely extruding a tubular portion of plastic material and of a height substantially equal to the length of a neck on the hollow article to be formed in upward direction from an extrusion die; inserting into said extruded portion a blow nozzle having an outer diameter equal to the inner diameter of the neck to be formed; moving a pair of complementary ring halves having an inner surface corresponding to the outer surface of the neck to be formed in direction transverse to the axis of said tubular portion against the latter so as to form the neck of the article between the outer surface of said blow nozzle and the inner surface of said ring halves; moving the neck portion formed between the closed ring halves and the blow nozzle upwardly in axial direction by simultaneously moving said blow nozzle and said ring halves in said direction while continuing extrusion of plastic material through said die and controlling the speed of said movement to obtain a tube of desired wall thickness; closing a pair of mold halves of the tube thus formed while pinching the tube closed adjacent said extrusion die; blowing at least after said mold halves are closed air through said blow nozzle to expand said tube against the inner surface of said mold halves to finish the hollow article; severing the thus formed article from the extrusion die; and opening said ring halves and said mold halves to remove said article.

2. A machine for forming hollow articles of plastic material comprising, in combination, support means; extrusion means mounted on said support means and including an extrusion die having a substantailly vertical axis for extruding a plastic tube in upward direction; a pair of complementary mold halves mounted on said support means movable in direction transverse to said axis between an open and a closed position; a blow nozzle having an outer diameter equal to the inner diameter of a neck of the article to be formed, said blow nozzle being arranged concentric with said axis and being movable between a lowered position abutting against said extrusion die and a raised position; a traverse connected to said blow nozzle for movement therewith and extending transversely to the direction of movement of said mold halves so as to be movable therebetween when the latter are in said open position; a pair of complementary ring halves surrounding said blow nozzle and having inner surfaces corresponding to the outer surface of said neck, said ring halves being movable in direction of said traverse between an open and a closed position; a pair of moving means respectively mounted on opposite ends of said traverse and operatively connected to said ring halves for moving the same between said positions thereof; second moving means mounted on said support means and operatively connected to said blow nozzle for moving the same and said traverse connected thereto between said lowered and said raised positions; and third moving means operatively connected to said mold halves for moving the same between said positions thereof.

3. A machine for forming hollow articles of plastic material comprising, in combination, support means; extrusion means mounted on said support means and including an extrusion die having a substantially vertical axis for extruding a plastic tube in upward direction; a pair of complementary mold halves mounted on said support means movable in direction transverse to said axis between an open and a closed position; a blow nozzle having an outer diameter equal to the inner diameter of a neck of the article to be formed, said blow nozzle being arranged concentric with said axis and being movable between a lowered position abutting against said extrusion die and a raised position; a traverse connected to said blow nozzle for movement therewith and extending transversely to the direction of movement of said mold halves so as to be movable therebetween when the latter are in said open position; a pair of complemenetary ring halves surrounding said blow nozzle and having inner surfaces corresponding to the outer surface of said neck, said ring halves being movable in direction of said traverse between an open and a closed position; a pair of moving means respectively mounted on opposite ends of said traverse and operatively connected to said ring halves for moving the same between said positions thereof; second moving means mounted on said support means and operatively connected to said blow nozzle for moving the same and said traverse connected thereto between said lowered and said raised positions; third moving means operatively connected to said mold halves for moving the same between said positions thereof; and means operatively connected to said third moving means for insuring a position of the mold halves in closed condition coaxial with said axis.

4. A machine for forming hollow articles of plastic material comprising, in combination, support means; extrusion means mounted on said support means and including an extrusion die having a substantially vertical axis for extruding a plastic tube in upward direction; a pair of complementary mold halves mounted on said support means movable in direction transverse to said axis between an open and a closed position, said pair of mold halves having each a side face directed toward and engaging the side face of the other mold half when said mold halves are in said closed position; a blow nozzle having an outer diameter equal to the inner diameter of a neck of the article to be formed, said blow nozzle being arranged concentric with said axis and being movable between a lowered position abutting against said extrusion die and a raised position; a traverse connected to said blow nozzle for movement therewith and extending transversely to the direction of movement of said mold halves so as to be movable therebetween when the latter are in said open position; a pair of complementary ring halves surrounding said blow nozzle and having inner surfaces corresponding to the outer surface of said neck, said ring halves being movable in direction of said traverse between an open and a closed position; a pair of moving means respectively mounted on opposite ends of said traverse and operatively connected to said ring halves for moving the same between said positions thereof; second moving means mounted on said support means and operatively connected to said blow nozzle for moving the same and said traverse connected thereto between said lowered and said raised positions; third moving means operatively connected to said mold halves for moving the same between said positions thereof; and means operatively connected to said third moving means for stopping movement of one of said mold halves before the side face thereof engages the side face of the other mold half and permitting final closing movement of said one mold half only after the other mold half has reached a position in which the end face of the latter is located in a plane passing through said axis.

5. A machine for forming hollow articles of plastic material comprising, in combination, a base member having an upper substantially horizontal guide surface; a pair of uprights projecting upwardly from opposite ends of said base member and having each an upper inwardly projecting portion projecting toward but ending short of the inwardly projecting portion of the other upright, each of said inwardly projecting portions having a lower guide surface substantially parallel to and spaced from said upper guide surface of said base member; extrusion means mounted in said base member and including an extrusion die having a substantially vertical axis located between and substantially equally spaced from said inwardly extending portions of said uprights for extruding a plastic tube upwardly in axial direction; a pair of complementary mold halves located in the space between said uprights and being movable in direction transverse to said axis between an open and a closed position, each of said mold halves having a side face and said side faces engaging each other when said mold halves are in said closed position; a blow nozzle having an outer diameter equal to the inner diameter of a neck of the article to be formed, said blow nozzle being arranged concentric with said axis and being movable between a lowered position abutting against said extrusion die and a raised position; a traverse connected to said blow nozzle for movement therewith and extending transversely to the direction of movement of said mold halves so as to be movable therebetween when the latter are in said open position; a pair of complementary ring halves surrounding said blow nozzle and having inner surfaces corresponding to the outer surface of said neck, said ring halves being movable in direction of said traverse between an open and a closed position; a pair of moving means respectively mounted on opposite ends of said traverse and operatively connected to said ring halves for moving the same between said positions thereof; second moving means mounted on an additional upright connected to said base member and operatively connected to said blow nozzle for moving the same and said traverse connected thereto between said lowered and said raised positions; a pair of guide means respectively fixed to said mold halves for guiding the same during the movement thereof between said open and said closed positions and each having a pair of guide portions respectively engaging said upper guide surface of said base and the lower guide surface of the respective upright; a pair of hydraulic moving means respectively mounted on said pair of uprights and operatively connected to said guide means and said mold halves connected thereto for moving the latter between said open and said closed positions; stop means movable between an active and an inoperative position and cooperating when in said active position with one of said guide means for stopping closing movement thereof before the side face of the mold half connected thereto engages the side face of the other mold half while permitting final closing movement of said mold halves when said stop means is in said inoperative position; and switch means operatively connected to said stop means for moving the latter to said inoperative position thereof when said switch means are engaged by said guide means of the other mold half and said switch means being engaged by said guide means when the end face of the other mold half has reached an end position aligned with a plane passing through said axis.

References Cited in the file of this patent
UNITED STATES PATENTS

| | | |
|---|---|---|
| 2,899,709 | Steiner | Aug. 18, 1959 |
| 2,908,034 | Hackett | Oct. 13, 1959 |